Figure 1:
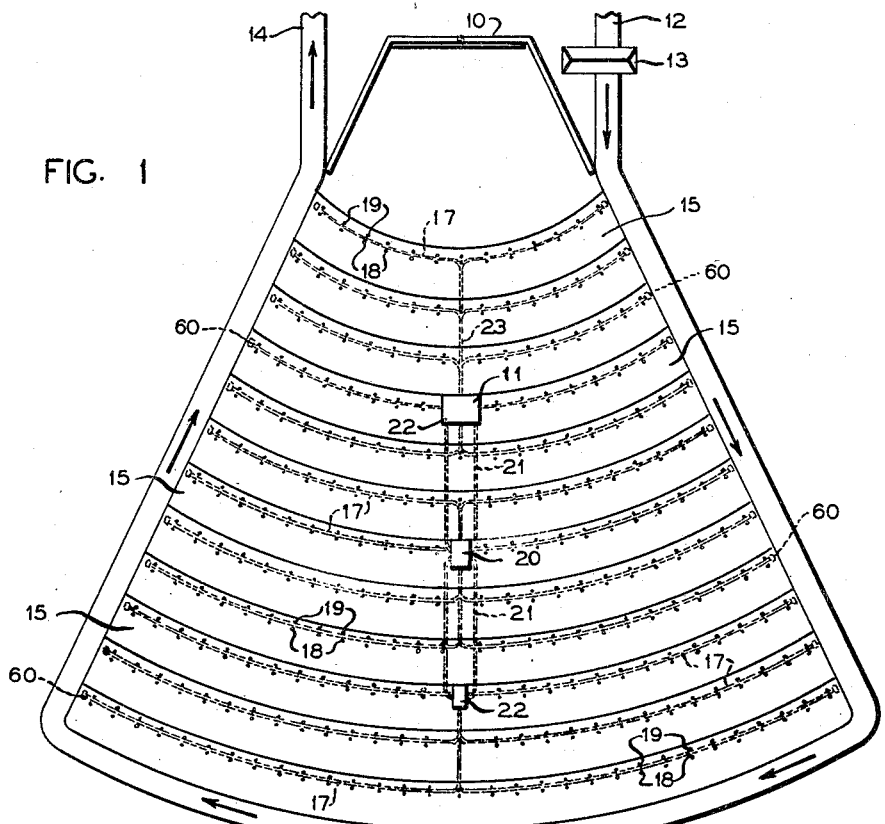

June 7, 1955 — W. E. ENGLE ET AL — 2,709,953
AIR CONDITIONING SYSTEM
Filed May 22, 1950 — 4 Sheets-Sheet 1

INVENTORS
W. E. ENGLE
D. E. LEONARD
BY
A. Yates Dowell
ATTORNEY

June 7, 1955
W. E. ENGLE ET AL
2,709,953
AIR CONDITIONING SYSTEM
Filed May 22, 1950
4 Sheets-Sheet 2
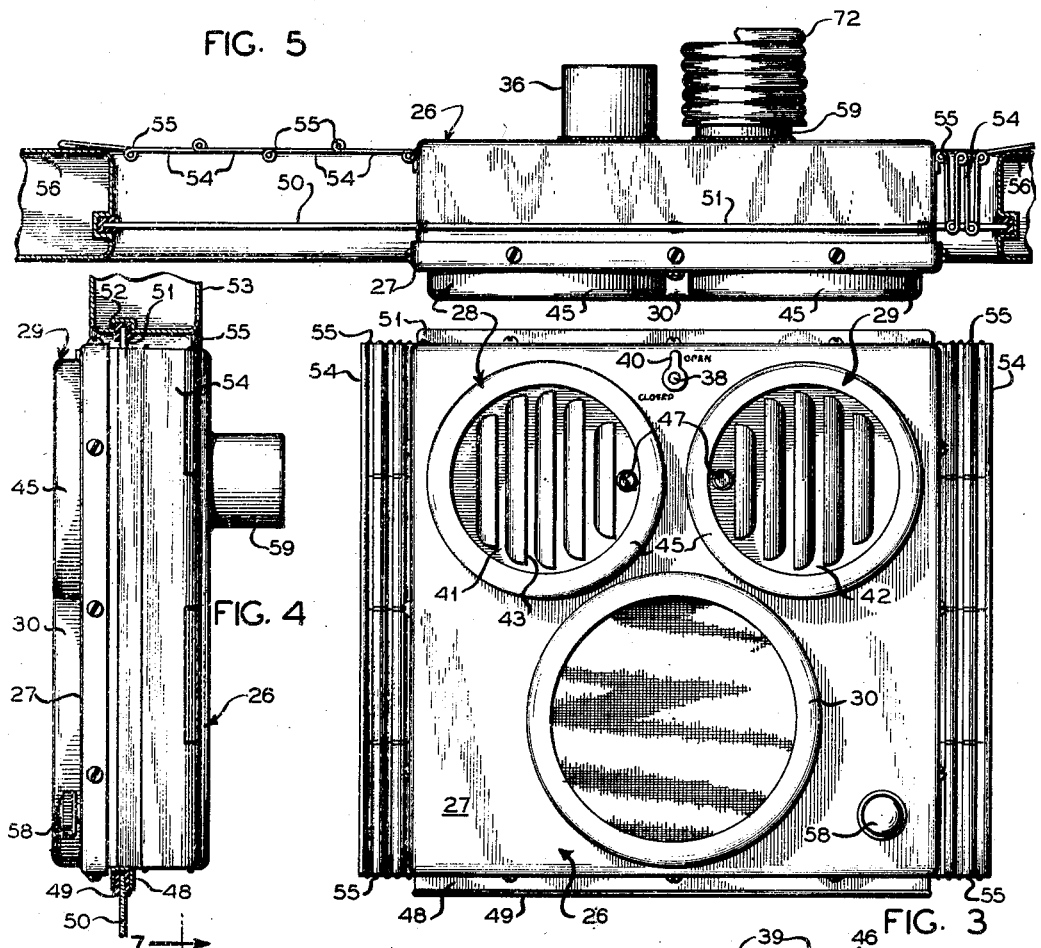
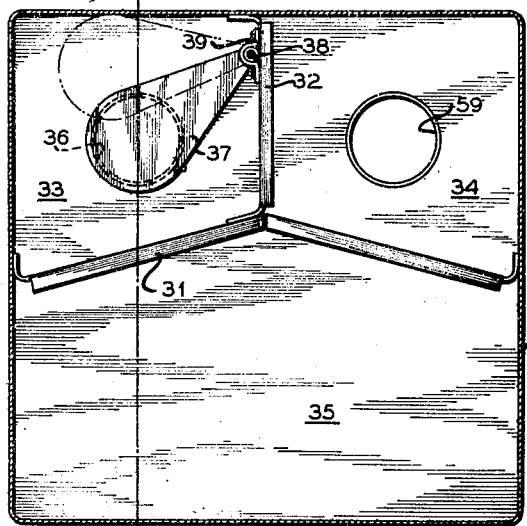
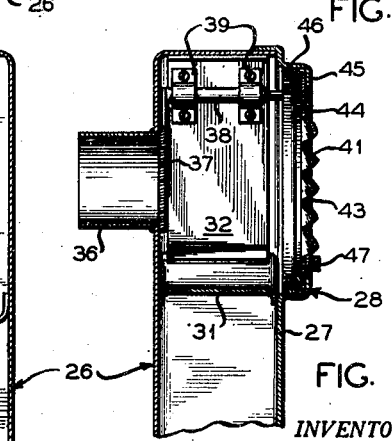
INVENTORS
W. E. ENGLE
D. E. LEONARD
BY
A. Yates Dowell
ATTORNEY

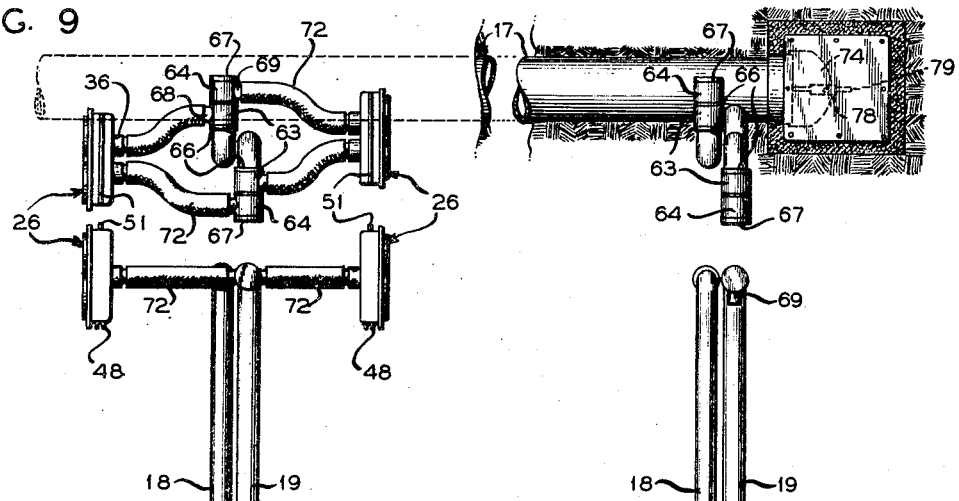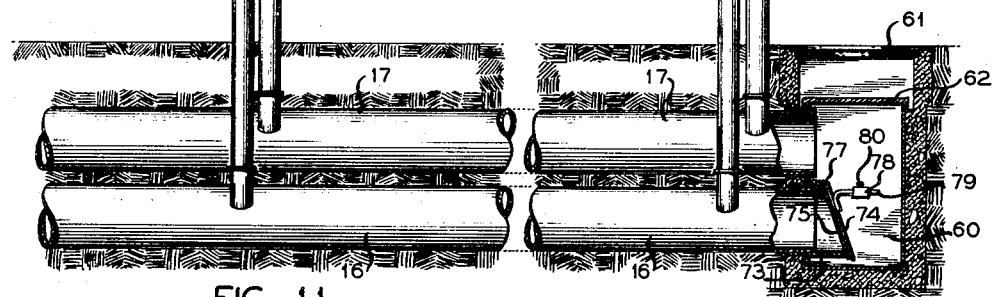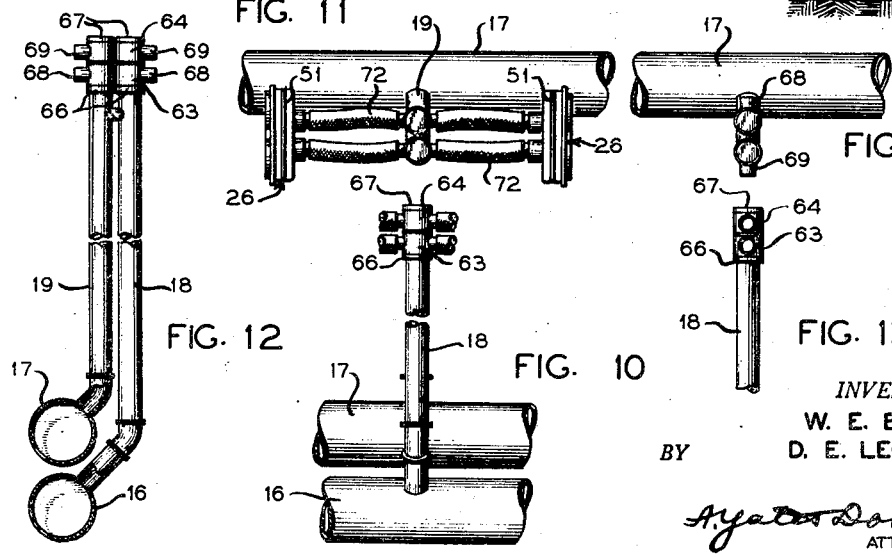

June 7, 1955 W. E. ENGLE ET AL 2,709,953
AIR CONDITIONING SYSTEM
Filed May 22, 1950 4 Sheets-Sheet 4
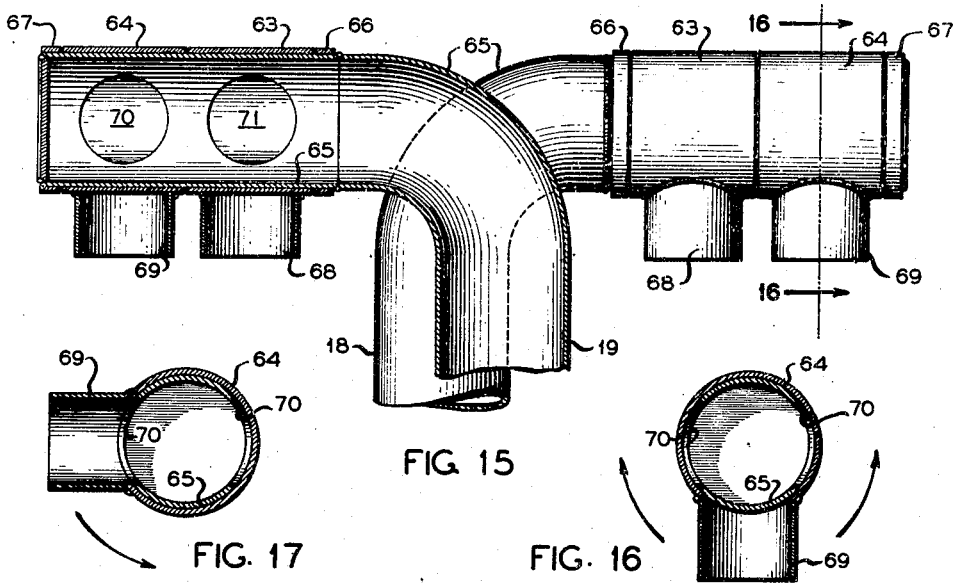
FIG. 15
FIG. 17
FIG. 16
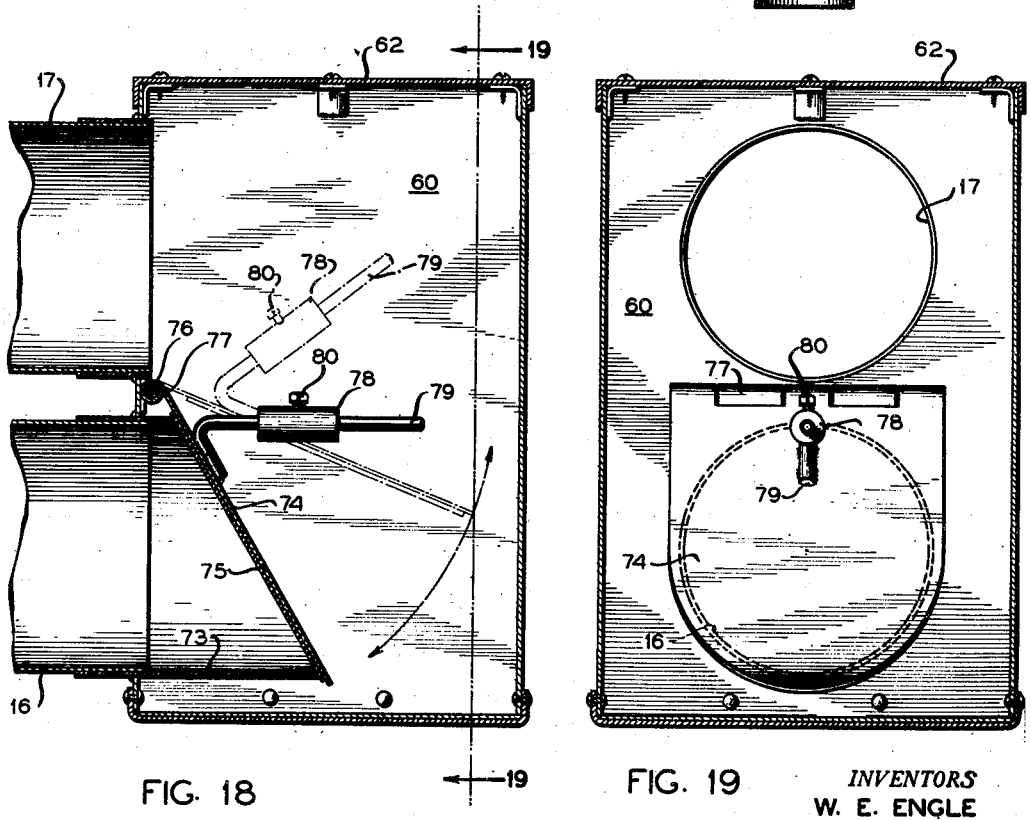
FIG. 18
FIG. 19
INVENTORS
W. E. ENGLE
D. E. LEONARD
BY
A. Yates Dowell
ATTORNEY United States Patent Office 2,709,953
Patented June 7, 1955

2,709,953

AIR CONDITIONING SYSTEM

Walter E. Engle and David E. Leonard, Lakeland, Fla.

Application May 22, 1950, Serial No. 163,472

11 Claims. (Cl. 98—2)

This invention relates to air conditioning and more particularly to a system and apparatus for supplying heated, cooled or fresh air to a plurality of automobiles which may be parked at a drive-in theatre, a curb service restaurant or any other location where automobiles may be situated and where the occupants thereof would normally remain in the cars.

During recent years drive-in theatres and curb service restaurants have become increasingly popular and the supply of conditioned air to these vehicles has become somewhat of a necessity since, as is well known in drive-in theatres, insects and the like are attracted by the lights and during the summer months where it is necessary for the windows of an automobile to be kept lowered in order to provide sufficient comfort for the occupants, the problem of insects entering the car and annoying the occupants has become rather serious.

A further drawback with drive-in theatres has been the fact that the period of operation during the year has been extremely limited due to climatic variations and this is, of course, more serious in the northern sections of the country than in the south. The problem of maintaining the occupants of the automobiles in comfort is extremely important since if it is possible to maintain these occupants in substantially home comfort or in an atmosphere comparable with that of the normal indoor theatre then drive-in theatres will be able to increase their business and consequent profits a material amount. Also, with an efficient and conveniently operable air conditioning system these theatres will be able to operate over a substantial portion of the year rather than merely in the summer months as at present.

It is therefore an object of this invention to provide a system and apparatus for supplying conditioned air to automobiles in drive-in theatres or other places where they may congregate, the air being supplied individually to each automobile.

It is a further object of the invention to provide a system and apparatus for supplying conditioned air to groups of automobiles and which system is extremely flexible in that substantially the same quantity of air will be supplied to each automobile regardless of the total number of automobiles being serviced.

It is a further object of the invention to provide an air conditioning system for drive-in theatres or the like in which individual units for each automobile are supplied, these units having provisions for adapting the same to various sizes of window openings and which may be easily and quickly installed by an attendant.

It is a further object of the invention to provide an air conditioning system for drive-in theatres in which the individual units for application to each automobile incorporate means for directing the flow of conditioned air from the unit to any part thereof and also incorporate means for controlling the volume of conditioned air introduced thereto.

It is a further object of the invention to provide an air conditioning system for drive-in theatres and the like in which the individual units for application to each automobile also incorporate the loud speaker or other sound producing device whereby the occupants of the car may clearly hear the program.

It is a further object of the invention to provide an air conditioning system for drive-in theatres or the like in which the individual units for application to each automobile include flexible conduits for providing conditioned air and for removing stale air from the cars these conduits being attached to permanently installed supply and exhaust ducts and in which means is provided for automatically closing these ducts upon removal of the unit from each car and for automatically opening the ducts upon application of the unit to the car.

It is a further object of the invention to provide an air conditioning system for drive-in theatres or the like which utilizes readily available commercial components and which may be economically installed in existing theatres or in theatres under construction and in which the operating costs are largely dependent on the number of cars being serviced thereby maintaining such operating cost at a minimum and commensurate with the patronage of the theatre.

Figure 2:
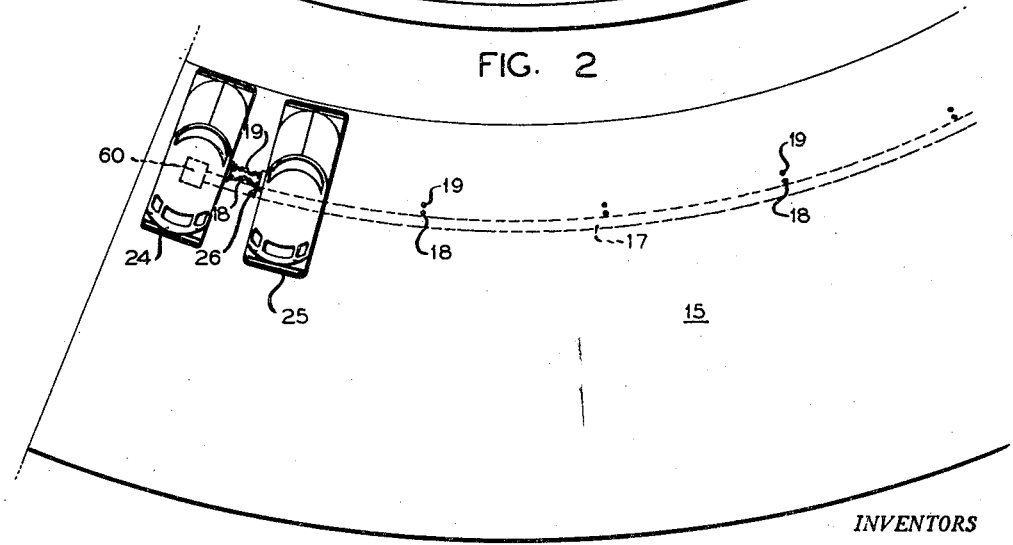

Further objects and advantages of the invention will be apparent from the following specification taken in conjunction with the accompanying drawing, wherein:

Fig. 1 is a diagrammatic layout of a conventional drive-in theatre showing the air conditioning system of this invention installed therein;

Fig. 2, a fragmentary view on an enlarged scale showing two automobiles parked in a conventional drive-in theatre and connected to the air conditioning system of this invention;

Fig. 3, a front elevation view of the individual air conditioning unit for installation in each automobile;

Fig. 4, a side elevational view of the individual car unit of Fig. 3 with the unit installed in an automobile and showing the adjacent parts of the automobile in section for greater clarity;

Fig. 5, a top plan view of the individual car unit of Fig. 3 showing the unit installed in an automobile and particularly the means for closing the window opening at each side of the unit and also the manner in which the unit is adapted to various sized openings;

Fig. 6, a sectional view of the individual car unit and parts thereof with particular reference to the means for controlling the flow of conditioned air to the automobile;

Fig. 7, a fragmentary sectional view on the line 7—7 of Fig. 6 showing the outlet louver for the individual car unit and the manner of mounting this louver in order to direct the inflowing air to various parts of the automobile and also showing the particular arrangement of the control for the incoming conditioned air;

Fig. 8, a fragmentary elevational view showing the permanently installed supply and exhaust ducts and the manner of connecting these ducts to individual conditioning units for each automobile and a further means for supplying a substantially uniform volume of conditioned air to each automobile regardless of the number of automobiles being serviced;

Fig. 9, a top plan view of the arrangement shown in Fig. 8;

Fig. 10, a fragmentary elevational view showing an alternative arrangement to that shown in Fig. 8;

Fig. 11, a top plan view of the arrangement shown in Fig. 10;

Fig. 12, a side elevational view of the arrangement shown in Fig. 10;

Fig. 13, a fragmentary front elevational view showing the connections for the individual air conditioning units in the position they occupy prior to connection of the individual units thereto;

Fig. 14, a top plan view of the arrangement shown in Fig. 13;

Fig. 15, an elevational view with parts in section for greater clarity and showing the particular arrangement of the automatically operating outlet and inlet valve for the supply exhaust ducts;

Fig. 16, a sectional view on the line 16—16 of Fig. 15 showing the connection to the duct in closed position;

Fig. 17, a sectional view similar to Fig. 16 and showing the outlet connection to the duct in open position;

Fig. 18, a sectional view to an enlarged scale showing the valve and control arrangement for insuring a substantially uniform supply of conditioned air to each automobile regardless of the automobiles being serviced; and Fig. 19, a sectional view on the line 19—19 of Fig. 18.

With continued reference to the drawing there is shown in Fig. 1 a conventional drive-in theatre having a screen 10, a projection house 11, and incoming driveway 12, and ticket booth 13. The driveway 12 extends all of the way around the theatre and leads to an exit 14 and as is common in drive-in theatres there is provided a series of arcuate driveways or aisles 15, connecting with the incoming drive at one end and the exit drive at the opposite end, each of these aisles being intended to accommodate a plurality of automobiles.

Installed under each aisle 15, is a conditioned air supply duct 16, and an exhaust duct 17, these ducts being connected to stand pipes 18 and 19, respectively, arranged between each two adjacent parking spaces.

A refrigeration unit is arranged preferably substantially centrally of the theatre and may be housed in a room below ground level, such room being indicated at 20, the refrigerant or heating medium as the case may be being conducted through pipes 21 to a plurality of heat exchange units 22 located at intervals substantially along the center line of the theatre, one of the units 22 being located in the projection house 11. The supply and exhaust ducts 16 and 17 are connected to common supply and exhausts ducts indicated generally at 23, these common ducts being further connected to the heat exchange units 22 thus supplying conditioned air to the stand pipes 18 and 19 and conducting stale air from these stand pipes back to the heat exchange unit.

As best shown in Fig. 2 two automobiles 24 and 25 are parked in one of the aisles 15 these automobiles being connected to one pair of stand pipes 18 and 19 for the purpose of supplying conditioned air to the automobiles and for removing the stale air therefrom. It will be obvious that automobiles such as 24 and 25 may occupy all of the parking spaces or these automobiles may be scattered through-out the theatre and the air conditioning system of this invention is so designed that the amount or quantity of conditioned air delivered to each of the automobiles is substantially the same regardless of the number of automobiles connected to the system.

Since the automobiles patronizing a drive-in theatre and other places where the air conditioning system of this invention might well find application are of widely divergent types and sizes, it is necessary to provide a means for connecting the system to the automobiles which is universal in application and which may be quickly and conveniently installed by the attendants.

The individual unit for connecting the system to each automobile is best shown in Figs. 3–7 and comprises a generally rectangular casing or housing 26 in the front wall 27 of which may be provided an air inlet opening 28 an air outlet opening 29 and a loud speaker opening 30. If desired, however, the loud speaker opening may be omitted and only the inlet and outlet for air be provided in the unit the loud speaker being installed in the car as a separate unit.

As best shown in Fig. 6 the interior of the casing 26 is divided into compartments by a transverse partition 31 and a vertical centrally located partition 32, thus providing an air inlet chamber 33, an air outlet chamber 34 and a loud speaker chamber 35. With reference to Fig. 7 the air inlet chamber 33 is provided with a conduit connection 36 which may be connected to the conditioned air supply stand pipe as will be explained hereinafter.

Since it is desirable to control the amount of air supplied to each automobile, control means in the form of a damper 37 is pivotally mounted by a shaft 38 on the vertical partition 32, the shaft 38 being secured in place by bearings 39. Shaft 38 extends outwardly of the front panel 27 of the unit 26 and may be provided with a finger engaging actuating knob 40 and suitable indicia on the panel 27 to indicate when the damper 37 is opened or closed and also the degree of opening for any position between these extremes. Individual control of each unit is thereby provided in a simple and easily operable manner.

Since it is also imperative that the occupants of the automobile not be subjected to drafts or blasts of air there is provided for the outlet opening 28 and inlet opening 29 adjustably mounted louvers 41 and 42 respectively, these louvers having air passages 43 which serve to direct the flow of air in one direction. The louvers 41 and 42 comprise a plate 44 in which the openings 43 are formed, these plates 44 being rotatably mounted between flanges 45 and 46, there being a finger engaging knob 47 provided on the plate to facilitate convenient rotation thereof and orientation of the openings 43 in any desired direction. By proper adjustment of the louvers 41 and 42 it will be readily apparent that the flow of air through the automobile may be so controlled that the occupants thereof will not be subjected to undesirable drafts.

The lower edge of the individual car unit 26 is provided with a channel 48 which may be lined with rubber or other resilient material 49, this channel being designed to receive the upper edge of the car window 50. The upper edge of the unit 26 is provided with a rib or tongue 51 which is intended to enter the channel 52 provided in the upper portion of the door structure 53 whereby upon positioning of the unit 26 within the window opening and raising of the window 50 to engage the channel 48 and to force the rib or tongue 51 into the channel 52, the unit will be firmly secured in place in the window opening. Each side of the unit 26 is provided with extensible means for accommodating the unit to window openings of various widths and shapes. This extensible means may be identical on each side of the unit and comprises a plurality of hingedly connected leaves 54 connected by hinge pins 55 and which as shown in Fig. 5 may be extended to engage the side surfaces 56 of the automobile door structure adjacent the window opening. As shown in Fig. 5, the unit 26 is positioned to one side of the window opening, but if desired the unit may be centrally located or positioned at either side depending upon the wishes of the occupants and the particular structure of the car being serviced.

The unit 26 may be provided with a volume control 58 for varying the output of the loudspeaker 30 in order to accommodate same to the desires of the occupants of the vehicle, but as stated above it is not necessary to include the loudspeaker or the volume control as a part of the air conditioning car unit and this is included as part of the disclosure in order to show the convenience of an installation such as this in which all of the necessary components utilized in drive-in theatres may be assembled in one compact unit for convenient handling by the attendant.

The air outlet chamber 34 may be provided with a fitting or thimble 59 similar to the fitting or thimble 36 communicating with the air inlet chamber 33 which fitting 59 may be utilized to connect the outlet chamber with the air exhaust stand pipe 19 and exhaust duct 17.

The arrangement of the air supply and exhaust duct 16 and 17 is best shown in Figs. 8 and 9 and there is one pair of these ducts for each aisle 15. The ducts 16 and 17 are preferably embedded in the earth, a sufficient distance below the surface to preclude crushing of the same by the weight of the vehicles passing thereover and these ducts may conveniently terminate at each end in a well 60 which may be constructed of concrete or other desirable material embedded in the earth the well 60 being provided with an access cover or a man hole plate 61 substantially at ground level, there being a second sealing cover or plate 62 positioned within the well to provide a substantially air tight compartment. The exhaust duct 17 is open at each end in direct communication with the well 60 and the supply duct 16 is provided with a control valve at each end the construction of which will be presently explained.

The air supply and exhaust stand pipes 18 and 19 are connected to the supply and exhaust ducts 16 and 17 and extend above the surface of the earth a distance substantially equal to the height of the midpoint of the window opening in the normal automobile. In the preferred form of the invention the upper ends of stand pipes 18 and 19 are bent at right angles thereto and extend in opposite directions as best shown in Figs. 9 and 15.

The head end of each stand pipe 18 and 19 is provided with two connecting fittings which as best shown in Figs. 9 and 15 may comprise two axially aligned rotatably mounted sleeves 63 and 64 which are received on the right angularly extending portion 65 of each of the pipes 18 and 19. The sleeves 63 and 64 are held against axial movement on the portions 65 by collars 66 and 67 which may be secured to the portion 65 by welding or in any other suitable manner. The sleeves 63 and 64 are provided with connecting fittings 68 and 69 which may be secured to the sleeve 63 and 64 by welding or the like, the fittings 68 and 69 serving to provide a convenient means for attaching a flexible conduit for communication with the inlet and outlet fittings 36 and 59 of the individual car units 26.

Since it is desirable that the fittings 68 and 69 be in communication with the interior of stand pipes 18 and 19 only when connected to a vehicle, means is provided whereby these fittings are automatically placed in communication with, or out of communication with the interior of these stand pipes and this structure is best shown in Figs. 15–17. As shown therein the right angle portions 65 are provided with apertures 70 and 71 the axes of which are in the horizontal plane and with the fittings 68 and 69 in the position shown in Figs. 15 and 16 the apertures 70 and 71 are closed and there will be no flow of air either into or from the stand pipes 18 and 19. Upon rotation of the fittings 68 and 69 and sleeves 63 and 64 from the position shown in Fig. 16 to the position shown in Fig. 17 the fitting 68 will be brought into alignment with the apertures 70 and 71 thus opening communication to the interior of the stand pipes 18 and 19 and providing for the flow of air into or from such stand pipes. The sleeves 63 and 64 are freely rotatably on the portions 65 and consequently upon the disconnection of the conduits from unit 26 to the fittings 68 and 69 the weight of these fittings will cause the sleeves 63 and 64 to rotate by the action of gravity to the down position as shown in Fig. 16 thus closing the apertures 70 and 71 and preventing communication with the atmosphere from the interior of stand pipes 18 and 19.

Stand pipes 18 and 19 are connected with the car unit 26 through flexible conduits 72 which may be formed of suitable material such as fabric or rubber or if desired these conduits may be substantially rigid and be supplied with slip joints to permit extension or retraction to accommodate for different positions of vehicles and also if desired angularly displaceable joints may be incorporated in the conduit to permit installation of the units 26 at different levels above the ground.

The structure just described permits opening or closing of the stand pipes automatically by the force of gravity but if desired an alternative structure may be employed in which the stand pipes are closed manually or in which spring means may be provided to rotate the sleeves and fittings to closed position.

Such structure is shown in detail in Figs. 10–14 and in this form of the invention the stand pipes 18 and 19 are not bent at right angles at the upper ends as shown in Figs. 8, 9 and 15, but extend upwardly with the sleeves 63 and 64 installed with their axes in a vertical direction and with the fittings 68 and 69 extending in a horizontal direction. The fittings 68 and 69 are connected to the car units 26 in the same manner as above described, but in this instance the fittings 68 and 69 with their associated sleeves 63 and 64 must be rotated manually to open or closed position or as stated above spring means may be incorporated to automatically rotate the sleeves to closed position upon removal of the conduits 72 from the fittings 68 and 69.

As stated above it is extremely important that the supply of air to the automobiles be substantially constant regardless of the number of automobiles connected to the system and the structure for accomplishing this purpose is shown in detail in Figs. 8, 18 and 19. This structure is particularly simple, involves only a single moving part and yet is highly practical and efficiently operates to perform its intended function. With particular reference to these figures the supply duct 16 is connected at each end to a tubular member 73 extending into the well 60, member 63 being cut at its end to provide an angular face against which is adapted to seat a valve or flap 74. Flap 74 may be provided with a resilient facing 75 of rubber or the like which seats against the end of member 73 to provide a fluid tight seal. Flap 74 is pivotally secured to one wall of well 60 by a hinge pin 76 and ears 77. The flap 74 is commonly maintained in engagement with member 73 by a weight 78 slidably adjustable on rod 79 which may be secured by welding or the like to the flap 74. The weight 78 is maintained in adjusted position by a set screw 80 or other suitable means, engaging the rod 79. The operation of flap valve 74 depends upon the air pressure in supply duct 16, the valve being closed when the pressure is at a minimum and being opened as shown in dotted lines in Fig. 18 when this pressure is at a maximum.

For convenience in describing the operation of the air conditioning system of this invention, it is assumed that automobiles 24 and 25 have entered the theatre and selected parking places in the aisles or parking drives 15 on opposite sides of supply and exhaust stand pipes 18 and 19. Obviously the drivers of these automobiles could have selected any other desired locations there being no requirement that automobiles be parked in sequence or in any particular order. After the drivers of the cars have selected their locations an attendant approaches with the car unit 26 which is positioned in the window opening as described above in order to seal the interior of the car from the atmosphere and thus prevent the entry of cold or warm air from the outside. The attendant after installing the unit 26 which has been connected to the stand pipes 18 and 19 through conduits 72 thereupon passes on to the next car and until it is necessary to remove the units 26 the attendant's duties are completed. As explained above upon attaching the conduits 72 to the fittings 68 and 69 the sleeves 63 and 64 are rotated to the position shown in Fig. 17 thereby establishing communication between the stand pipes and the conduits 72 thus permitting conditioned air to flow through air inlet opening 28 and stale air in the automobile to be exhausted through outlet opening 29. When the driver of any car desires to leave the theatre it is merely necessary for him to call the attendant who removes the unit 26 and the operation of removing this unit and disconnecting the conduits therefrom automatically closes the apertures 70 and 71 in the stand pipes and destroys communication between these stand pipes and the atmosphere.

As stated above the quantity of air delivered to each car may be controlled by the occupants thereof by manipulating damper 37 through finger engaging knob 40 and likewise the direction of air flow from fitting 26 into the car and from the car through the outlet opening 29 may be controlled by proper orientation of louvers 41 and 42. Likewise the volume level of sound emanating from the loud-speaker 30 may be controlled by proper manipulation of the volume control knob 58.

Since the supply ducts 16 are connected to the car units the air pressure in the supply ducts 16 will vary directly in accordance with the number of units 26 which are connected thereto. The weight 78 which controls flapper valve 74 is adjusted in such a manner that when all of the stand pipes are open and supplying air to automobiles the valve 74 will be closed as shown in Fig. 18. This represents the maximum load on the system and all of the air supplied by the system would be conducted to the automobiles and serve to condition the interior thereof. Of course, during this period all stale air in the automobiles would be withdrawn therefrom through the stand pipes 19 and exhaust duct 17 to be returned to the heat exchange unit 22 to be cooled or heated as the case may be. If, however, there are no cars in an aisle or if only a few automobiles are connected to the stand pipes in that aisle the valve 74 will occupy an intermediate position between the dotted line and closed position. The pressure in duct 16 is directly proportional to the number of stand pipes 18 which are open and as will be readily apparent in the event that few stand pipes are open the valve 74 is either completely or partially open and excess air flowing from duct 16 will enter well 60 and be returned to the heat exchange units through exhaust ducts 17 thus reducing the load on the heating or refrigeration system in accordance with the number of automobiles connected to the system.

It is contemplated that during the spring and fall months, it will not be necessary to supply either heat or refrigeration to the automobiles and consequently during these periods the system will serve to circulate fresh air to the automobiles and withdraw stale air therefrom while at the same time precluding the entry of insects or undesirable noises to the interior of the cars. During the winter months, of course, heated air may be supplied and during the summer months refrigerated air would be available.

It will be seen that by the above invention there has been provided a relatively simple, inexpensive, yet highly efficient installation for providing heated, refrigerated or fresh air to automobiles in a drive-in theatre or similar installation which at the same time precludes insects and outside noises from entering the automobile which system comprises relatively few moving parts and is simple and fool proof in operation requiring practically no service once initial adjustments have been made and which at the same time includes means whereby the occupants of the automobile may control the supply of air thereto as well as the direction of flow of air within the automobile. Such a system materially increases the number of months during the year which an outdoor theatre may operate and also materially contributes to the comfort of the patrons and consequently results in greater prosperity for the owners of these installations.

It will be obvious to those skilled in the art that various changes may be made in the invention without departing from the spirit and scope thereof and therefore the invention is not limited by that which is shown in the drawing and described in the specification but only as indicated in the appended claims.

What is claimed is:

1. An air conditioning system for drive-in theatres or the like in which there are provided a plurality of aisles and side by side car parking spaces in each aisle comprising air supply and exhaust ducts for each aisle, air supply and exhaust stand pipes communicating with said ducts and disposed between alternate adjacent parking spaces, a central air conditioning apparatus for supplying conditioned air to said supply duct, a car unit having means for securing the same in a window opening of a car, adjustable means on said unit for closing the window opening, an air inlet and outlet opening in said unit whereby conditioned air may be supplied to each car and stale air withdrawn therefrom, means in said unit for controlling the flow of air through said inlet opening, means on said unit for directing the flow of air from said inlet opening and the flow of air into said outlet opening, conduit means for connecting said inlet and outlet openings to said stand pipes, valve means on each stand pipe constructed and arranged to automatically open when said stand pipe is connected to a car unit and to automatically close when disconnected therefrom, means connecting the supply duct and exhaust duct for each aisle, an adjustable pressure operated valve for controlling the flow of air from said supply duct to said exhaust duct, said valve being adjusted to fully open when all stand pipes connected with said supply duct are closed and to close when all stand pipes are open and to partially close in proportion to the number of stand pipes which are open whereby a substantially uniform flow of air to each car is maintained regardless of the number of cars connected to each supply duct and means for returning air from said exhaust ducts to said air conditioning apparatus.

2. An air conditioning system for drive-in theatres or the like in which there are provided a plurality of aisles and side by side car parking spaces in each aisle comprising air supply and exhaust ducts for each aisle, air supply and exhaust stand pipes communicating with said ducts and disposed between alternate adjacent parking spaces, a central air conditioning apparatus for supplying conditioned air to said supply ducts, a car unit having means for securing the same in a window opening of a car, air inlet and outlet openings in said unit whereby conditioned air may be supplied to each car and stale air withdrawn therefrom, means in said unit for controlling the flow of air through said inlet opening, means on said unit for directing the flow of air from said inlet opening and the flow of air into said outlet opening, conduit means for connecting said inlet and outlet openings to said stand pipes, valve means on each stand pipe constructed and arranged to automatically open when said stand pipe is connected to a car unit and to automatically close when disconnected therefrom, means connecting the supply duct and exhaust duct for each aisle, an adjustable pressure operated valve for controlling the flow of air from said supply duct to said exhaust duct through said means connecting the supply duct and exhaust duct, said valve being adjusted to fully open when all stand pipes connected with said supply duct are closed and to close when all stand pipes are open and to partially close in proportion to the number of stand pipes which are open whereby a substantially uniform flow of air to each car is maintained regardless of the number of cars connected to each supply duct and means for returning air from said exhaust ducts to said air conditioning apparatus.

3. An air conditioning system for drive-in theatres or the like in which there are provided a plurality of aisles and side by side car parking spaces in each aisle comprising air supply and exhaust ducts for each aisle, air supply and exhaust stand pipes communicating with said ducts and disposed between alternate adjacent parking spaces, a central air conditioning apparatus for supplying conditioned air to said supply duct, a car unit having means for securing the same in a window opening of a car, air inlet and outlet openings in said unit whereby conditioned air may be supplied to each car and stale air withdrawn therefrom, means on said unit for directing the flow of air from said inlet opening and the flow of air into said outlet opening, conduit means for connecting said inlet and outlet openings to said stand pipes, valve means on each stand pipe constructed and arranged to automatically open when said stand pipe is connected to a car unit and to automatically close when disconnected therefrom, means connecting the supply duct and exhaust duct for each aisle, an adjustable pressure operated valve for controlling the flow of air from said supply duct to said exhaust duct through said means connecting the supply duct and exhaust duct, said valve being adjusted to fully open when all stand pipes connected with said supply duct are closed and to close when all stand pipes are open and to partially close in proportion to the number of stand pipes which are open whereby a substantially uniform flow of air to each car is maintained regardless of the number of cars connected to each supply duct and means for returning air from said exhaust ducts to said air conditioning apparatus.

4. An air conditioning system for drive-in theatres or the like in which there are provided a plurality of aisles and side by side car parking spaces in each aisle comprising air supply and exhaust ducts for each aisle, air supply and exhaust stand pipes communicating with said ducts and disposed between alternate adjacent parking spaces, a central air conditioning apparatus for supplying conditioned air to said supply duct, a car unit having means for securing the same in a window opening of a car, air inlet and outlet openings in said unit whereby conditioned air may be supplied to each car and stale air withdrawn therefrom, conduit means for connecting said inlet and outlet openings to said stand pipes, valve means on each stand pipe constructed and arranged to automatically open when said stand pipe is connected to a car unit and to automatically close when disconnected therefrom, means connecting the supply duct and exhaust duct for each aisle, an adjustable pressure operated valve for controlling the flow of air from said supply duct to said exhaust duct through said means connecting the supply duct and exhaust duct, said valve being adjusted to fully open when all stand pipes connected with said supply duct are closed and to close when all stand pipes are open and to partially close in proportion to the number of stand pipes which are open whereby a substantially uniform flow of air to each car is maintained regardless of the number of cars connected to each supply duct and means for returning air from said exhaust ducts to said air conditioning apparatus.

5. An air conditioning system for drive-in theatres or the like in which there are provided a plurality of aisles and side by side car parking spaces in each aisle comprising air supply and exhaust ducts for each aisle, air supply and exhaust stand pipes communicating with said ducts and disposed between alternate adjacent parking spaces, a central air conditioning apparatus for supplying conditioned air to said supply duct, a car unit having means for securing the same in a window opening of a car, air inlet and outlet openings in said unit whereby conditioned air may be supplied to each car and stale air withdrawn therefrom, conduit means for connecting said inlet and outlet openings to said stand pipes, means connecting the supply duct and exhaust duct for each aisle, an adjustable pressure operated valve for controlling the flow of air from said supply duct to said exhaust duct through said means connecting the supply duct and exhaust duct, said valve being adjusted to fully open when all stand pipes connected with said supply duct are closed and to close when all stand pipes are open and to partially close in proportion to the number of stand pipes which are open whereby a substantially uniform supply of air to each car is maintained regardless of the number of cars connected to each supply duct and means for returning air from said exhaust ducts to said air conditioning apparatus.

6. An air conditioning system for drive-in theatres or the like in which there are provided a plurality of aisles and side by side car parking spaces in each aisle comprising air supply and exhaust ducts for each aisle, air supply and exhaust stand pipes communicating with said ducts and disposed between alternate adjacent parking spaces, a central air conditioning apparatus for supplying conditioned air to said supply duct, a car unit having means for securing the same in a window opening of a car, air inlet and outlet openings in said unit whereby conditioned air may be supplied to each car and stale air withdrawn therefrom, conduit means for connecting said inlet and outlet openings to said stand pipes, means connecting the supply duct and exhaust duct for each aisle and an adjustable pressure operated valve for controlling the flow of air from said supply duct to said exhaust duct through said means connecting the supply duct and exhaust duct, said valve being adjusted to fully open when all stand pipes connected with said supply duct are closed and to close when all stand pipes are open and to partially close in proportion to the number of stand pipes which are open whereby a substantially uniform flow of air to each car is maintained regardless of the number of cars connected to each supply duct.

7. An air conditioning system for drive-in theatres or the like in which there are provided a plurality of aisles and side by side car parking spaces in each aisle comprising air supply and exhaust ducts for each aisle, air supply and exhaust stand pipes communicating with said ducts and disposed between alternate adjacent parking spaces, a central air conditioning apparatus for supplying conditioned air to said supply duct, a car unit having means for securing the same in a window opening of a car, air inlet and outlet openings in said unit whereby conditioned air may be supplied to each car and stale air withdrawn therefrom, conduit means for connecting said inlet and outlet openings to said stand pipes, means connecting the supply duct and exhaust duct for each aisle and an adjustable pressure operated valve for controlling the flow of air from said supply duct to said exhaust duct through said means connecting the supply duct and exhaust duct, said valve controlling said flow in proportion to the number of stand pipes which are open whereby a substantially uniform flow of air to each car is maintained regardless of the number of cars connected to each supply duct.

8. For use in an air conditioning system for drive-in theatres and the like a car unit adapted to be removably installed in a window opening of a car comprising a casing having a front panel and a rear cover member, a channel secured to the lower edge of said casing for receiving the upper edge of the car window glass, a tongue secured to the upper edge of said casing and adapted to be received in the upper glass receiving channel of the window opening, an extensible wall secured to each side of said casing and comprising a plurality of hingedly connected leaves the outermost leaf of each wall being constructed and arranged to engage the car surface adjacent the window opening to close said opening, vertical and transverse partitions in said casing extending the full distance between the front and back panels dividing the same into inlet, outlet and loudspeaker compartments, an air inlet in said rear cover member communicating with said inlet compartment, an air outlet in said rear cover member communicating with said outlet compartment, means for controlling the flow of air through said inlet comprising a damper pivotally mounted on said vertical partition, an actuating shaft extending from said damper through said front panel and a finger engaging knob on said shaft to facilitate actuation thereof, openings in said front panel communicating with said inlet and outlet compartments, a louver adjustably disposed in each opening each louver comprising a plate having substantially parallel angularly directed air passages therein, spaced flanges surrounding said openings said plates being rotatably received between said flanges, a finger engaging knob on each plate to facilitate rotation thereof, a loud-speaker opening in said front panel communicating with said loud-speaker compartment, a loud-speaker disposed in said compartment and a volume control projecting through said front panel and having a finger engaging knob whereby the output of said loud-speaker may be controlled.

9. For use in an air conditioning system for drive-in theatres and the like a car unit adapted to be removably installed in a window opening of a car comprising a casing having a front panel and a rear cover member, a channel secured to the lower edge of said casing for receiving the upper edge of the car window glass, a tongue secured to the upper edge of said casing and adapted to be received in the upper glass receiving channel of the window opening, an extensible wall secured to each side edge of said casing and comprising a plurality of hingedly connected leaves the outermost leaf of each wall being constructed and arranged to engage the car surface adjacent the window opening to close said opening, vertical and transverse partitions in said casing extending the full distance between the front and back panels dividing the same into inlet and outlet compartments, an air inlet in said rear cover member communicating with said inlet compartment, an air outlet in said rear cover member communicating with said outlet compartment, means for controlling the flow of air through said inlet comprising a damper pivotally mounted on said vertical partition, an actuating shaft extending from said damper through said front panel and a finger engaging knob on said shaft to facilitate actuation thereof, openings in said front panel communicating with said inlet and outlet compartments and a louver adjustably disposed in each opening each louver comprising a plate having substantially parallel angularly directed air passages therein, spaced flanges surrounding said openings said plates being rotatably received between said flanges and a finger engaging knob on each plate to facilitate rotation thereof.

10. For use in an air conditioning system for drive-in theatres and the like a car unit adapted to be removably installed in a window opening of a car comprising a casing having a front panel and a rear cover member, a channel secured to the lower edge of said casing for receiving the upper edge of the car window glass, a tongue secured to the upper edge of said casing and adapted to be received in the upper glass receiving channel of the window opening, an extensible wall secured to each side edge of said casing and comprising a plurality of hingedly connected leaves the outermost leaf of each wall being constructed and arranged to engage the car surface adjacent the window opening to close said opening, vertical and transverse partitions in said casing extending the full distance between the front and back panels dividing the same into inlet and outlet compartments, an air inlet in said rear cover member communicating with said inlet compartment, an air outlet in said rear cover member communicating with said outlet compartment, means for controlling the flow of air through said inlet comprising a damper pivotally mounted in said casing, means for operating said damper, openings in said front panel communicating with said inlet and outlet compartments and a louver adjustably disposed in each opening each louver comprising a plate having substantially parallel angularly directed air passages therein, spaced flanges surrounding said openings said plates being rotatably received between said flanges and a finger engaging knob on each plate to facilitate rotation thereof.

11. For use in an air conditioning system for drive-in theatres and the like a car unit adapted to be removably installed in a window opening of a car comprising a casing having a front panel and a rear cover member, a channel secured to the lower edge of said casing for receiving the upper edge of the car window glass, a tongue secured to the upper edge of said casing and adapted to be received in the upper glass receiving channel of the window opening, vertical and horizontal transverse partitions in said casing extending the full distance between the front and back panels dividing the same into inlet and outlet compartments, an air inlet in said rear cover member communicating with said inlet compartment, an air outlet in said rear cover member communicating with said outlet compartment, means for controlling the flow of air through said inlet comprising a damper pivotally mounted in said casing, means extending through the front panel for operating said damper, and openings in said front panel communicating with said inlet and said outlet compartments.

References Cited in the file of this patent

UNITED STATES PATENTS

| Number | Name | Date |
|---|---|---|
| 760,182 | Chapman et al. | May 17, 1904 |
| 940,590 | Gay | Nov. 16, 1909 |
| 1,718,083 | Segelken | June 18, 1929 |
| 1,750,789 | Thompson | Mar. 18, 1930 |
| 1,970,766 | Pfahl | Aug. 21, 1934 |
| 2,052,453 | Dollinger | Aug. 25, 1936 |
| 2,091,594 | Innes | Aug. 31, 1937 |
| 2,125,646 | Nessell | Aug. 2, 1938 |
| 2,279,271 | Williams | Apr. 7, 1942 |
| 2,327,664 | Otis | Aug. 24, 1943 |
| 2,463,339 | Wetzel et al. | Mar. 1, 1949 |
| 2,495,861 | Newton | Jan. 31, 1950 |
| 2,529,425 | Sharp | Nov. 7, 1950 |
| 2,588,086 | Cole | Mar. 4, 1952 |
| 2,588,756 | Ofterbro et al. | Mar. 11, 1952 |
| 2,614,478 | Herman | Oct. 21, 1952 |
| 2,658,439 | Royal | Nov. 10, 1953 |

FOREIGN PATENTS

| 344,914 | Great Britain | Mar. 9, 1931 |

OTHER REFERENCES

"Air Conditioned Drive-in Theaters," by Carl F. Boester, Heating and Ventilating, July 1949, pages 57 and 58.